United States Patent Office 3,340,183
Patented Sept. 5, 1967

3,340,183
PROCESS FOR DECOLORIZING OILS
Clark J. Egan, Piedmont, Calif., assignor to Chevron Research Company, San Francisco, Calif., a corporation of Delaware
No Drawing. Filed Aug. 5, 1965, Ser. No. 477,606
2 Claims. (Cl. 208—212)

ABSTRACT OF THE DISCLOSURE

A process for decolorizing a dark-colored heavy oil containing nitrogen and sulfur compounds by contacting the oil and hydrogen with the major upstream portion of a denitrification-hydrocracking catalyst, maintained at 650°–850° F., followed by contacting the oil with the minor downstream portion of the catalyst at below 450° F., and thereafter withdrawing the decolorized liquid oil at the low temperature.

DESCRIPTION OF THE INVENTION

This invention relates to processes for improving the color of liquid hydrocarbon oils, and more particularly it relates to processes for treating lubricating oils with hydrogen in the presence of catalysts.

Mild hydrofining treatments have been applied as a finishing step to improve the color of refined lubricating oils. Erratic results are obtained insofar as color is concerned in catalytic hydrofining treatment applied to heavy, dark-colored, crude lube distillates and residua. Although the color of such raw impure oils can be considerably improved by severe hydrofining treatments, it is rare that a truly colorless oil can be produced directly by processes heretofore known and used.

It has now been found that colorless heavy oil can be produced from dark-colored heavy oil by a severe hydrofining treatment wherein there is employed a catalytic aftercooler.

In accordance with the present invention a dark-colored heavy oil containing nitrogen and sulfur compounds is passed with hydrogen at elevated pressure through a reaction zone containing a sulfactive hydrogenation catalyst having denitrification and hydrocracking activity. The temperature in the upstream portion of the reaction zone wherein most of the contacting of oil with hydrogen and the catalyst occurs is maintained in the range 650–850° F. This upstream portion of the reaction zone contains sufficient catalyst to provide a long contact time until the organic nitrogen and sulfur compounds in the oil are substantially converted to ammonia and hydrogen sulfide. Lower temperatures are maintained in a relatively small downstream portion of the reaction zone where the contacting of the oil with the catalyst and hydrogen is continued for a relatively short time at a low temperature below about 450° F. Decolorized liquid oil effluent is withdrawn directly from said reaction zone at the low temperature below about 450° F.

The relatively small downstream portion of the reaction zone which is maintained at the low temperature functions essentially as a catalytic aftercooler. Very little in the way of hydrogenation or other reactions occurs therein because of the very low temperature and the short time of contact between oil and catalyst. In fact, so far as has been ascertained, the only function of the catalyst in this section is to prevent certain undesired thermally-induced reactions from occurring. It appears that color bodies are formed in prior hydrofining processes during the period that the oil effluent of the hydrofining reactor is being cooled from the hydrofining temperature to a lower temperature while in contact with the reactor outlet piping and heat exchanger internals. By performing this cooling within the reaction zone while the oil is in contact with the catalyst, it appears that the formation of these color bodies is prevented.

Hydrofining processes have been proposed heretofore wherein the hydrogen treating would be carried out in two separate and distinct stages, comprising a first hydrofining at relatively severe conditions, cooling and separating the effluent into fractions, and further hydrofining a fraction at relatively milder conditions. In such processes it will be observed that color bodies can form during the cooling of the effluent of the first reaction zone, and that these color bodies must then be converted to colorless materials in the subsequent hydrofining stage, which may be as large as the first stage. In contrast to that situation, in the process of the present invention the color bodies are prevented from ever forming, and the low temperature downstream portion of the reaction zone amounts to only a small fraction of the total catalyst and reactor volume required, generally representing less than 15% of the total catalyst charge.

Example 1

A heavy gas oil was hydrofined by passing serially through fixed beds of nickel sulfide-tungsten sulfide-alumina-silica-zirconia sulfactive hydrogenation catalyst particles in a reaction zone at an overall liquid hourly space velocity of 1.25 volumes of oil per volume of catalyst per hour (LHSV), in admixture with about 6000 standard cubic feet of hydrogen per barrel. The temperature in the catalyst beds was maintained at about 785° F., and the pressure was 2400 p.s.i.g. The oil feed was dark orange and the oil product was a lemon-yellow color. The product contained only 0.1 p.p.m. organic nitrogen. A small additional catalyst bed was then added to the downstream portion of the reaction zone, and the run was repeated at the same conditions in the upstream catalyst beds while cooling the oil and hydrogen passing through the last downstream section rapidly to about 400° F. at the reaction zone outlet. The product oil was essentially colorless, i.e. water white. Of the total amount of catalyst employed 92% was contained in the upstream catalyst beds of the reaction zones which were maintained at 785° F., and only the remaining 8% of the catalyst was contained in the last downstream bed portion of the reaction zone wherein the temperature was declining rapidly to about 400° F.

Examples 2 and 3

Samples of deasphalted residua, derived from waxy crude in Example 2 and from mixed crudes in Example 3, were hydrofined similarly as in Example 1; first using several beds of catalyst at a high temperature and a space velocity appropriate to essentially completely remove organic nitrogen and sulfur; and then using the beds at the same severe conditions plus an additional small bed in which the temperature was dropped rapidly to about 400° F. The added small bed contained only $\frac{1}{12}$ as much catalyst as was in the upstream portion of the reaction zone. The colors of the feeds and products were compared, and it was found that the addition of the catalytic after-cooler resulted in greatly improved color.

Feed inspections, treating conditions, and color comparisons for the above three examples are presented in the following table.

| Fresh Feed Properties | Example 1 | Example 2 | Example 3 |
|---|---|---|---|
| Type of stock | Vacuum gas oil. | Deasphalted resid. (waxy crude). | Deasphalted resid. (mixed crudes). |
| Boiling Range, °F | 800–1,000 | 900+ | 800+. |
| Gravity, °API | 30.7 | 27.8 | 16.1. |
| Sulfur, wt. percent | 0.12 | 0.1 | 1.06. |
| Nitrogen, p.p.m | 418 | 830 | 7,400. |
| Treating Conditions: | | | |
| Temperature, °F | 785 | 790 | 790. |
| Space Velocity, LHSV. | 1.25 | 1.0 | 0.6. |
| Pressure, p.s.i.g | 2,400 | 2,400 | 2,400. |
| Color Inspections: | | | |
| Fresh Feed | Dark orange | Dark brown | Black. |
| Whole Product | Lemon yellow. | Yellow-orange. | Orange. |
| Whole Product, at 400° F. outlet. | Water white | Colorless * | Pale yellow-green ("lemonade"). |
| Whole Product Gravity, °API. | 41–45 | 39 | 32–37. |

* Faint bluish bloom.

The oils as withdrawn from the reaction zone were clear and transparent. On further cooling, their cloud points are reached and they become translucent or opaque. At room temperature, the colorless product of Example 2 is a white solid. Dewaxing yields excellent lubricating oils.

The decolorizing achieved in the process is a permanent, not transitory, improvement. Further evidence of this lies in an improvement in oxidation stability noted in the products. For example, in Example 2 above, the oil which had contacted only the high temperature catalyst beds had an oxidation stability of 7.9 hours whereas the same oil after the added lower temperature treatment in the last bed had an oxidation stability of 8.9 hours. These stability numbers refer to results of an accelerated oxidation test wherein an oxidation catalyst and an inhibitor are added to the oil, and indicate good response to additives. As is usual with oils of this type, additives and stabilizers will be added to the wax-free finished products to inhibit light-catalyzed discoloration occurring later.

The above data were obtained in a laboratory scale pilot plant wherein the temperature could be maintained at the indicated high levels in the upstream portion of the reaction zone by means of external heaters, and the rapid cooling in the small downstream portion of the reaction zone could be accomplished by means of an external cooling jacket around the outside of the bottom of the reactor. In a large scale commercial operation this technique is not too practical, but it has been determined that the needed rapid cooling from the high temperature of the upstream portion of the reaction zone to the low temperature at the reaction zone outlet can be achieved in a downflow multi-bed reactor by massive quenching with hydrogen-rich gas and/or oil introduced just above the bottom bed.

It is to be noted that because of the manner of cooling used in the foregoing examples, the temperature was not below 450° F. throughout the entire bottom bed, but the temperature was dropping rapidly therein from above 650° F. to about 400° F. It is estimated that only about the last 2% of the entire catalyst charge was operated at 400° F. In a commercial installation, only about this much equivalent contact time at the low temperature should be needed where the cooling is accomplished by injecting a cooler quench medium upstream of the last bed. The volume of catalyst required therein will be determined primarily by the rate of heat transfer obtainable, depending on the efficiency of contacting between the cool hot streams and the natures of the fluids involved.

The desired conversion of organic nitrogen and sulfur compounds to $NH_3$ and $H_2S$ is essentially completed in the hot upstream portion of the reaction zone in the sense that essentially no further conversion occurs in the final low temperature downstream portion even though significant amounts of unconverted organic nitrogen and sulfur compounds may remain in the oils. The contact time provided in the low temperature downstream portion is so short relative to the contact time provided in the high temperature upstream portion that the degree of completion of the reactions would not be greatly different even if the low temperature downstream portion were operated at the same temperature as the upstream portion. At the low temperature actually used in the last downstream portion, the small amount of catalyst therein is equivalent to a negligible increase in effective contact time so far as the reactions of converting organic nitrogen and sulfur compounds to $NH_3$ and $H_2S$ are concerned. Also, there was no detectable change in gravity of the oil in passing through the last downstream bed.

The catalysts employed in the process are the so-called sulfactive hydrogenation type. Such catalysts are characterized by immunity or resistance to poisoning by sulfur and nitrogen compounds. Generally, they are composed of metals from Group VI and Group VIII of the Periodic Table, as metals, or compounds such as the oxides or sulfides, sulfides being particularly preferred. The most preferred known catalysts comprise combinations of nickel or cobalt sulfides with molybdenum or tungsten sulfides, and the metal sulfides are usually and preferably distended in or on a porous refractory oxide carrier or support. As the carrier or support there may be used alumina or combinations of alumina with other refractory oxides such as silica, zirconia, titania, magnesia, and the like; or various combinations of such other oxides may be used without any alumina. Methods for preparing such catalysts are various and well known, including impregnation techniques wherein a porous refractory oxide carrier is first formed, and the Group VI and Group VIII metals are deposited thereon in the form of dissolved salts in solutions which are later converted to metal oxides by calcination. The carriers may be prepared by physically admixing but more usually by coprecipitation or cogellation techniques, in which latter cases it is also possible to incorporate one or more of the hydrogenating-dehydrogenating components, i.e., the Group VI or Group VIII metal, as an ingredient in the coprecipitation.

The catalyst employed in the low temperature downstream portion need not be the same as the catalyst employed in the high temperature upstream portion, but it should be of the same general type, i.e., a sulfactive hydrogenation catalyst, and it might as well be the same catalyst for the sake of simplicity and ease of catalyst handling.

Conditions employed in both the high temperature upstream portion and the low temperature downstream portion in the process of the invention include pressures of 1000–5000 p.s.i.g., preferably at least about 1500 p.s.i.g., and hydrogen-rich gas hroughput rates of 2000–20,000 s.c.f./barrel of oil, more desirably 4000–10,000 s.c.f./barrel. Flow rate of oil relative to catalyst in the high temperature upstream portion is in the range 0.2–10 volumes of oil per volume of catalyst per hour (LHSV), and the space velocity in the low temperature downstream portion will be much greater. As indicated, the contact time (inverse of LHSV) in the low temperature zone is only about 15% or less of the contact time in the entire reaction zone.

The temperature in the upstream portion may be from 600 to 900° F., but more usually in the range 650–850° F. As mentioned, it has been found that the temperature at the outlet of the downstream portion of the reaction zone should not exceed about 450° F. Color bodies appear to be formed in the reactor outlet piping above this temperature. An outlet temperature of 400° F. has been found to be highly satisfactory. Somewhat improved results are obtainable at lower temperatures, for example of 350° F., and slight improvement may occur as the outlet temperature is further lowered. The improvement gain, however, in attempting to achieve reactor outlet temperatures substantially below 350° F. is generally unwarranted because it is so much more economical to finish the cooling to temperatures below 350° F. by conventional indirect heat transfer means outside of the reactor.

The process of the invention is particularly advantageous for treating raw heavy impure oils to prepare purified lubricating oils of good color. Thus, the feedstocks treated are generally raw straight-run heavy oils such as vacuum gas oils, with greater advantages being obtained the heavier the oil undergoing treatment. Accordingly, the process is particularly suitable for decolorizing deasphalted residual oils in the preparation of bright stock. If the oil is already sufficiently refined such that a severe hydrogenation and hydrofining treatment, such as is contemplated for the bulk of the high temperature portion of the reactor, is not needed, the process of the invention provides lesser advantages. That is, the improvement noted is greatest in those cases where a high temperature of 700° F. or higher is needed in the upstream hydrofining portion of the reaction zone.

Whenever the treating conditions in the upstream hydrofining portion are sufficiently severe to cause substantial improvement in the color of the oil being treated, the provision of the catalytic after-cooler will effect a further marked improvement in product oil color. It is not necessary in every case that the organic nitrogen and sulfur compounds in the oil feed be essentially completely eliminated. It does appear necessary that the severe hydrofining be such that a dark brown or black oil would thereby be decolorized to at least a clear orange in order for the catalytic after-cooler to produce a nearly colorless oil product. To obtain a water white product by means of the catalytic after-cooler, the upstream severe hydrofining should essentially completely remove the organic nitrogen, i.e., to less than 1 p.p.m.

I claim:

1. A process for decolorizing a dark colored heavy oil containing nitrogen and sulfur compounds which comprises continuously passing said oil and hydrogen at elevated pressure above 1000 p.s.i.g. through a reaction zone to contact therein a sulfactive hydrogenation catalyst having denitrification and hydrocracking activities at temperatures maintained in the range 650–850° F. throughout most of the contacting until organic nitrogen and sulfur compounds in the oil feed are substantially converted to $NH_3$ and $H_2S$, maintaining a lower temperature in a downstream portion of the reaction zone and continuing the contacting of oil with the catalyst therein for a relatively short time while the oil is being cooled to a temperature of below about 450° F., and withdrawing decolorized liquid oil effluent from said reaction zone at said low temperature.

2. The process of claim 1 wherein the contact time of oil with catalyst at said low temperatures is less than 15% of the total contact time of oil with catalyst.

References Cited
UNITED STATES PATENTS

| | | | |
|---|---|---|---|
| 3,003,953 | 10/1961 | Evans | 208—254 |
| 3,006,843 | 10/1961 | Archibald | 208—264 |

DELBERT E. GANTZ, *Primary Examiner.*

S. P. JONES, *Assistant Examiner.*